(12) United States Patent
Wu

(10) Patent No.: US 9,580,131 B1
(45) Date of Patent: Feb. 28, 2017

(54) FOLDABLE CHILD'S TRICYCLE AND FOLDING METHOD THEREOF

(71) Applicant: Jiaxing Xiaohuzi Bike Factory Company Limited, Jiaxing (CN)

(72) Inventor: Chunhua Wu, Jiaxing (CN)

(73) Assignee: Jiaxing Xiaohuzi Bike Factory Company Limited, Jiaxing (CN)

( * ) Notice: Subject to any disclaimer, the term of this patent is extended or adjusted under 35 U.S.C. 154(b) by 0 days.

(21) Appl. No.: 15/081,539

(22) Filed: Mar. 25, 2016

(30) Foreign Application Priority Data

Jan. 19, 2016 (CN) .......................... 2016 1 0035426

(51) Int. Cl.
*B62K 5/00* (2013.01)
*B62K 15/00* (2006.01)
*B62K 5/06* (2006.01)

(52) U.S. Cl.
CPC ............... *B62K 15/006* (2013.01); *B62K 5/06* (2013.01)

(58) Field of Classification Search
CPC ........... B62K 5/02; B62K 5/06; B62K 15/006; B62K 15/001; B62K 15/008
See application file for complete search history.

(56) References Cited

U.S. PATENT DOCUMENTS

| | | | | |
|---|---|---|---|---|
| 3,015,498 A | * | 1/1962 | Tanaka .................. | B62K 15/006 280/278 |
| 4,460,192 A | * | 7/1984 | Takamiya ............ | B62K 15/008 280/278 |
| 4,895,386 A | * | 1/1990 | Hellestam ............ | B62K 15/008 280/278 |
| 5,186,482 A | * | 2/1993 | Sapper .................. | B62K 15/008 280/278 |
| 6,032,971 A | * | 3/2000 | Herder .................. | B62K 15/008 280/278 |
| 6,367,824 B1 | * | 4/2002 | Hayashi ................... | B62K 5/05 280/124.103 |
| 8,162,345 B1 | * | 4/2012 | Szu-Yao .............. | B62K 15/008 280/278 |
| 8,430,414 B1 | * | 4/2013 | Yap ...................... | B62K 15/008 280/278 |
| 8,894,084 B1 | * | 11/2014 | Yap ...................... | B62K 15/008 280/278 |
| 9,039,025 B1 | * | 5/2015 | Shih ...................... | B62K 15/006 280/282 |

(Continued)

*Primary Examiner* — Erez Gurari
(74) *Attorney, Agent, or Firm* — Wayne & King LLC

(57) ABSTRACT

A foldable child's tricycle and a folding method thereof are provided, wherein the foldable child's tricycle comprises a body frame and a handlebar arranged in the front of the body frame; wherein the body frame includes a head tube, an upper connecting rod assembly, a lower connecting rod assembly, a push rod assembly, and a supporting rod; the upper connecting rod assembly, the head tube, the lower connecting rod assembly, and the supporting rod form a four-bar linkage; the push rod assembly is rotatably connected to the upper connecting rod assembly, and is fixed to or separated from the lower connecting rod assembly via a locking device; when folding, firstly unlocking the locking device; then pulling the push rod assembly upwardly such that the push rod assembly is separated from the lower connecting rod assembly; finally turning over the push rod assembly forwardly, and the folding volume thereof is small.

20 Claims, 5 Drawing Sheets

(56) References Cited

U.S. PATENT DOCUMENTS

| | | | | |
|---|---|---|---|---|
| 2004/0032110 | A1* | 2/2004 | Bigot | B62K 15/008 280/287 |
| 2006/0196322 | A1* | 9/2006 | Chuang | B62J 7/04 81/177.85 |
| 2006/0244237 | A1* | 11/2006 | Chuang | B62K 15/006 280/278 |
| 2010/0066054 | A1* | 3/2010 | Chen | B62K 15/008 280/278 |
| 2010/0066055 | A1* | 3/2010 | Laxstrom | B62K 15/008 280/287 |
| 2011/0193313 | A1* | 8/2011 | Yun | B62K 15/008 280/278 |
| 2013/0087988 | A1* | 4/2013 | Wang | B62K 3/06 280/287 |
| 2015/0329165 | A1* | 11/2015 | Page | B62K 5/02 280/266 |
| 2015/0344092 | A1* | 12/2015 | Ben Meir | B62K 9/02 280/263 |

* cited by examiner

FOLDABLE CHILD'S TRICYCLE AND FOLDING METHOD THEREOF

TECHNICAL FIELD

The present application relates to a foldable child's tricycle and a folding method thereof.

BACKGROUND

Generally, an existing child's tricycle includes a front fork, a front wheel arranged at a lower part of the front fork, a handlebar arranged on the front fork and being capable of controlling a steering of the front wheel, a frame body extending in a front-rear direction, a seat arranged on the frame body, rear brackets respectively arranged on two sides of the frame body, and rear wheels respectively arranged on the corresponding rear brackets. However, the frame body of an existing child's tricycle is generally fixed together with a frame head tube which is sleeved on the outside of the handle bar, in such a way that the bracket can not be folded, and can only be presented in a riding state. When the tricycle is carried in outgoing, needs to be deposited or transported, it is inconvenient since the volume of the tricycle is too large, and the cost is high during the transportation.

BRIEF SUMMARY

The objective of the present application is to provide a foldable child's tricycle which has a smaller volume after being folded, and a folding method thereof.

In accordance with one aspect of the present application, a foldable child's tricycle is provided, which has an unfolded state and a folded state, the foldable child's tricycle comprises a body frame, a front fork positioned in the front of the body frame, a front wheel rotatably arranged at a lower part of the front fork, two rear wheel brackets arranged in the back of the body frame, and rear wheels respectively rotatably arranged on the rear wheel brackets; wherein the body frame includes a head tube arranged above the front fork, an upper connecting rod assembly rotatably connected to the head tube, a lower connecting rod assembly rotatably connected to the head tube, a push rod assembly connected in the back of the upper connecting rod assembly and the lower connecting rod assembly, and a supporting rod rotatably connected between the upper connecting rod assembly and the lower connecting rod assembly and further located in front of the push rod assembly; the upper connecting rod assembly, the head tube, the lower connecting rod assembly, and the supporting rod form a four-bar linkage; the push rod assembly is rotatably connected to the upper connecting rod assembly, and is fixed to or separated from the lower connecting rod assembly via a locking device; restricting structures are respectively arranged between the head tube and the upper connecting rod assembly, and between the head tube and the lower connecting rod assembly; after the child's tricycle is folded, the push rod assembly, the upper connecting rod assembly, the head tube, the lower connecting rod assembly and the supporting rod assembly draw close to each other.

Preferably, each of the restricting structures includes an upper restricting portion arranged at a lower part in the front of the upper connecting rod assembly, and a lower restricting portion arranged at a lower part in the front of the lower connecting rod assembly; when an upper part of the head tube turns over forwardly, the upper restricting portion and the lower restricting portion are respectively abutted against the head tube, thereby preventing the upper part of the head tube from turning over forwardly.

Preferably, the locking device includes a restricting element arranged at a lower part of the push rod assembly, a hole configured for the restricting element to run through and defined on a tube wall of the push rod assembly, and a restricting elastic element arranged between the restricting element and an inner tube wall of the push rod assembly; an unlock button cooperated with the restricting element is arranged on the lower connecting rod assembly; when the locking device is in a locking state, the restricting element runs through the hole, and is cooperated with the lower connecting rod assembly; when the locking device is in an unlocking state via the unlock button, the restricting element is separated from the lower connecting rod assembly, and the push rod assembly is slidable with respect to the lower connecting rod assembly.

Preferably, the push rod assembly includes a fixing rod and a sliding rod which is slidable with respect to the fixing rod, and the fixing rod is arranged on the outside of the sliding rod.

Preferably, a lower end of the sliding rod extends out of a lower end of the fixing rod, while an upper end of the sliding rod extends out of an upper end of the fixing rod.

Preferably, the foldable child's tricycle further includes a backrest configured for a back of a passage to rest against; an upper part of the backrest is rotatably connected to the sliding rod via a connecting element, and a lower part of the backrest is rotatably connected to the fixing rod; the connecting element, the backrest, the fixing rod and the sliding rod together form a crank sliding mechanism.

Preferably, the fixing rod is rotatably connected to the back of the upper connecting rod assembly, and the sliding rod is slidably connected to the lower connecting rod assembly.

Preferably, the locking device is arranged between the sliding rod and the lower connecting rod assembly.

Preferably, a connecting tube having a same extension direction with the push rod assembly is arranged in the back of the lower connecting rod assembly; the locking device includes a restricting element arranged at a lower part of the push rod assembly, a hole configured for the restricting element to run through and defined on a tube wall of the push rod assembly, and a restricting elastic element arranged between the restricting element and an inner tube wall of the push rod assembly; an unlock button cooperated with the restricting element is arranged on the connecting element; when the locking device is in a locking state, the restricting element runs through the hole, and is cooperated with the connecting tube; when the locking device is in an unlocking state via the unlock button, the restricting element is separated from the connecting tube, and the push rod assembly is slidable with respect to the connecting tube.

Preferably, the rear wheel brackets are fixedly connected to the connecting tube, thereby forming a "T"-shaped structure.

Preferably, the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

In accordance with another aspect of the present application, a folding method for a child's tricycle is further provided in the present application, wherein the method comprises the following steps: when folding, firstly unlocking the locking device; then pulling the push rod assembly upwardly such that the push rod assembly is separated from the lower connecting rod assembly; and finally turning over the push rod assembly forwardly in such a way that the push rod assembly, the head tube, the upper connecting rod assembly and the lower connecting rod assembly are stacked one to another from up to down.

Compared with the prior art, the body frame of the child's tricycle of the present application is designed as a four-bar linkage, and the body frame is folded by folding the four-bar linkage; besides, the restricting structures make the folding method of the four-bar linkage uniquely determined, such that the handlebar is backwardly folded on the body frame after being folded, and thus the folding volume of the child's tricycle is small.

BRIEF DESCRIPTION OF THE DRAWINGS

The child's tricycle of the present application and the advantageous effects will be further described with reference to the accompanying drawings and embodiments in the following.

DETAILED DESCRIPTION OF THE PREFERRED EMBODIMENT

The technical solution of the present application will now be described in detail with reference to the accompanying drawings and the specific embodiments.

Figure 1:
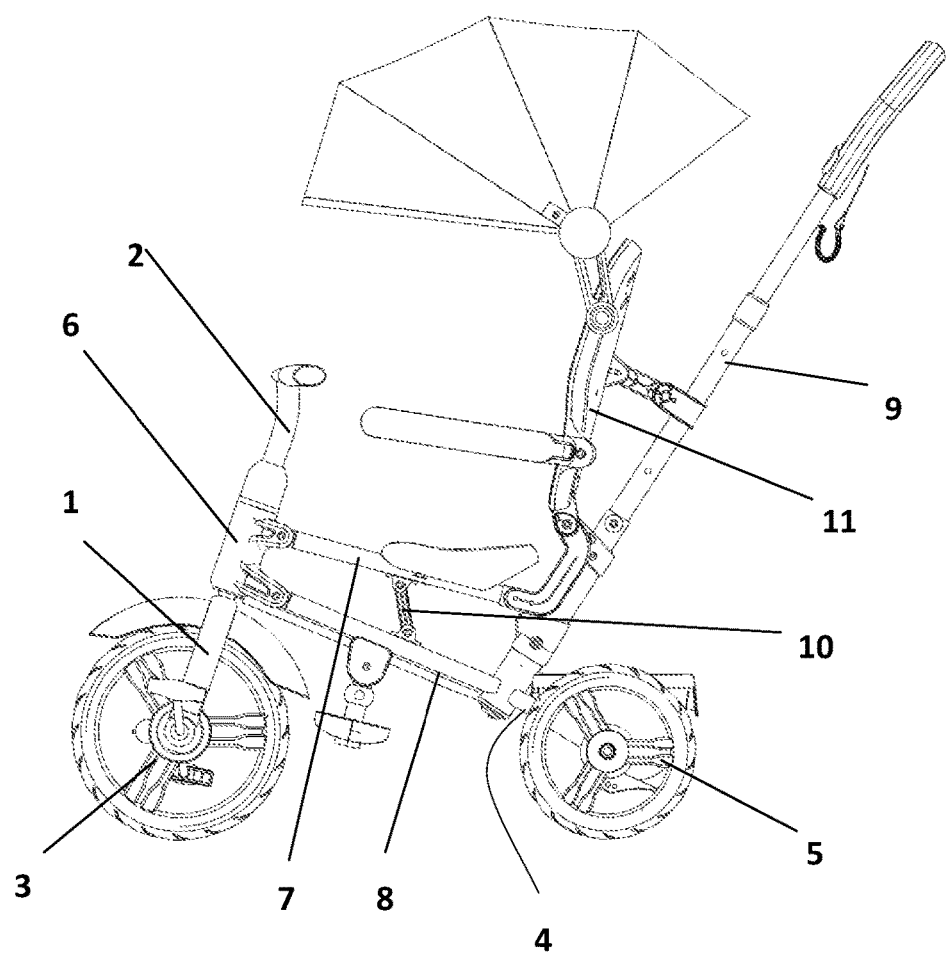
FIG. 1 is a schematic view of a child's tricycle according to the present application.
Figure 3:
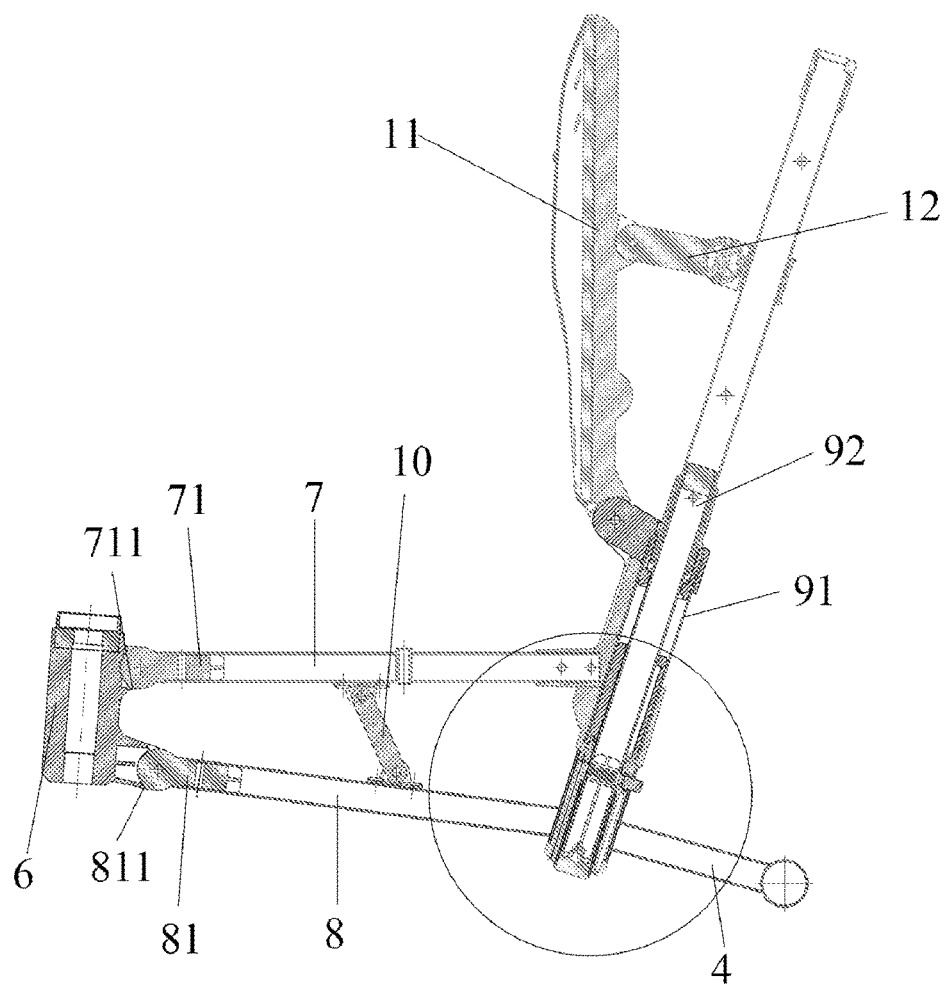
FIG. 3 is a cutaway view of a body frame of the child's tricycle according to the present application.

A foldable child's tricycle and a folding method are disclosed in the present application. Firstly, as shown in FIGS. 1 and 3, the child's tricycle using the folding method of the present application comprises a body frame, a front fork 1 positioned in the front of the body frame, a handlebar 2 arranged at an upper part of the front fork 1, a front wheel 3 rotatably arranged at a lower part of the front fork 1, two rear wheel brackets 4 arranged in the back of the body frame, and rear wheels 5 respectively rotatably arranged on the rear wheel brackets 4.

In this case, the body frame includes a head tube 6 sleeved on the handlebar, an upper connecting rod assembly 7 rotatably connected to the head tube 6, a lower connecting rod assembly 8 rotatably connected to the head tube 6, a push rod assembly 9 connected between the upper connecting rod assembly 7 and the lower connecting rod assembly 8, and a supporting rod 10 rotatably connected between the upper connecting rod assembly 7 and the lower connecting rod assembly 8 and further located in front of the push rod assembly 9. The handlebar is rotatable with respect to the head tube 6. The upper connecting rod assembly 7 is arranged above the lower connecting rod assembly 8, and a seat for a passage to sit is further provided on the upper connecting rod assembly 7. The supporting rod 10 is substantially in the middle between the upper connecting rod assembly 7 and the lower connecting rod assembly 8. When the child's tricycle is unfolded, the upper part of the supporting rod 10 is in the front, while the lower part is aslant arranged in the rear. The head tube 6, the lower connecting rod assembly 8, the supporting rod 10 and the upper connecting rod assembly 7 are rotatable with respect to each other, thereby forming a four-bar linkage.

Restricting structures are respectively arranged between the upper connecting rod assembly 7 and the head tube 6, and between the lower connecting rod assembly 8 and the head tube 6. In specific, an upper connecting joint 71 is provided in the front of the upper connecting rod assembly 7, and an upper restricting portion 711 is projected from a lower part in front of the upper connecting joint 71. While a lower connecting joint 81 is provided in the front of the lower connecting rod assembly 8, and a lower restricting portion 811 is projected from the lower part in front of the lower connecting joint 81. The upper connecting joint 71 and the lower connecting joint 81 are rotatably connected to the head tube 6, and the upper part of the head tube 6 can be exclusively folded backwardly due to the arrangement of the upper restricting portion 711 and the lower restricting portion 811.

Aback end of the upper connecting rod assembly 7 is rotatably connected to the push rod assembly 9, and a back end of the lower connecting rod assembly 8 is fixed to or unfolded and separated from the push rod assembly 9 via a locking device. When the locking device is in a locking state, the lower connecting rod assembly 8 is fixed to the push rod assembly 9. However, when the locking device is in an unlocking state, the lower connecting rod assembly 8 is unfolded and further separated from the push rod assembly 9; at this time, it is possible to rotate the push rod assembly 9 forwardly, such that the upper connecting rod assembly 7 drives the supporting rod 10 and the head tube 6 to rotate and fold.

Figure 4:
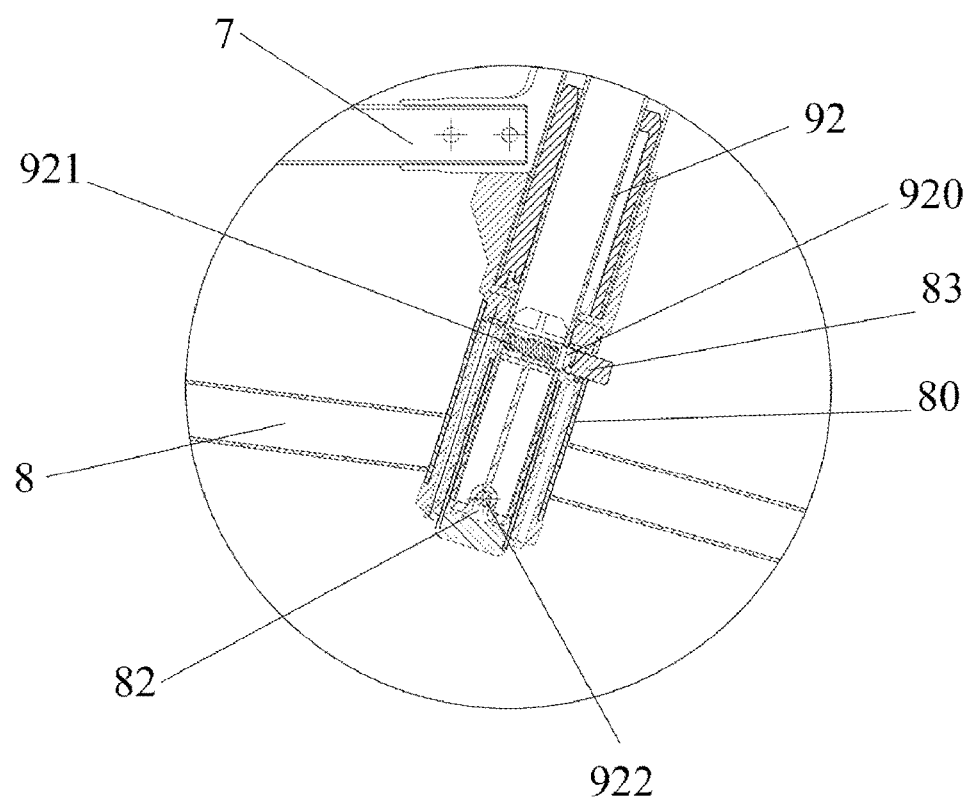
FIG. 4 is a partial view of the circle portion shown in FIG. 2.

As shown in FIG. 4, the locking device includes a restricting element 920 arranged in the push rod assembly 9, a hole configured for the restricting element 920 to run through and defined on a tube wall of the push rod assembly 9, and a restricting elastic element 921 arranged between the restricting element 920 and an inner tube wall of the push rod assembly 9. An extension direction of the restricting elastic element 921 is perpendicular to an extension direction of the push rod assembly 9, and the restricting elastic element 921 is configured to provide an elastic restoring force for the restricting element 920 to run through the hole. The restricting element 920 runs through the hole, and is cooperated with the lower connecting rod assembly 8, in such a way that the push rod assembly 9 is fixedly connected to the lower connecting rod assembly 8. The lower connecting rod assembly 8 is provided with an unlock button 83 cooperated with the restricting element 920. The unlock button 83 slides with respect to the lower connecting rod assembly 8, pushes the restricting element 920 to slide in the tube of the push rod assembly 9, and thus the push rod assembly 9 is unlocked with respect to the lower connecting rod assembly 8.

Figure 2:
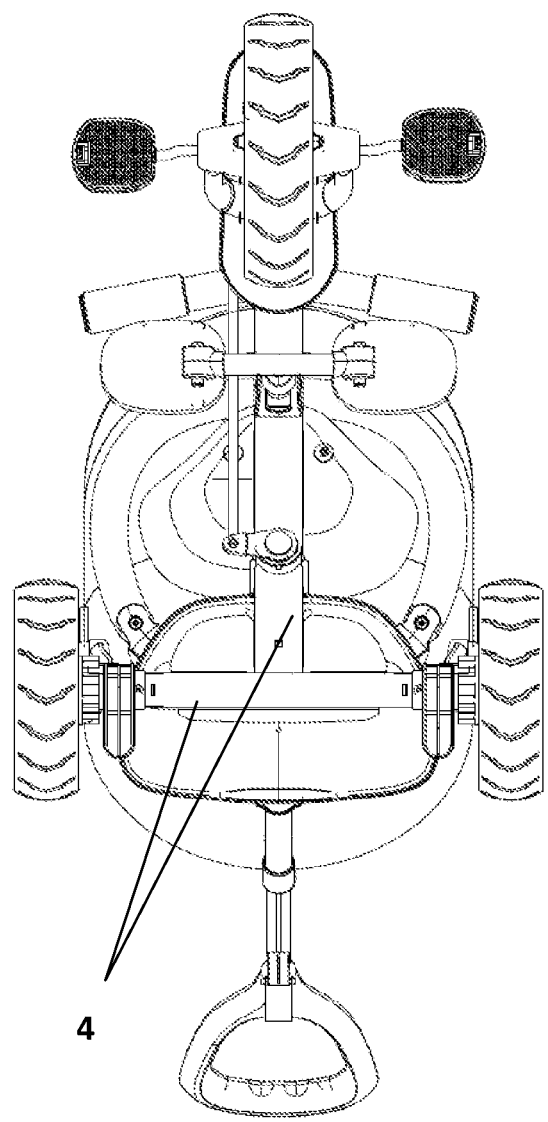
FIG. 2 is a bottom view of the child's tricycle according to the present application.

In specific, a connecting tube 80 is fixed in the back of the lower connecting rod assembly 8, and the connecting tube 80 aslant extends in an up-down direction. The connecting tube 80 and the push rod assembly are in the same extension direction. A connecting rivet 82 is fixed in the connecting tube 80, and a recess 922 is further provided at an end of the push rod assembly 9. When the locking device is in a locking state, the recess 922 is cooperated with the connecting rivet 82 in order to restrict the rotation of the push rod assembly 9 in the lower connecting rod assembly 8. The unlock button 83 is arranged on the connecting tube 80, and is configured to cooperate with the restricting element 920. The rear brackets are fixedly connected to the connecting tube 80, and are gradually separated from each other from the connecting tube 80 to the back, by which the structure is in shape of a "T", as is shown in FIG. 2.

In specific, the push rod assembly 9 includes a fixing rod 91 and a sliding rod 92 which is slidable with respect to the fixing rod 91. The fixing rod 91 is rotatably connected to the back end of the upper connecting rod assembly 7. The fixing rod 91 is sleeved outside the sliding rod 92, and the sliding rod 92 is slidable with respect to the fixing rod 91. A lower end of the sliding rod 92 extends out of the fixing rod 91, and is further inserted into the connecting tube 80. The restricting element 920 is arranged on a lower part of the sliding rod 92, and configured to lock the sliding rod 92 together with the connecting tube 90. A hole is defined on the tube wall of the sliding rod 92, and the elastic restricting element 921 is arranged between the restricting element 920 and the inner tube wall of the sliding rod 92. When the locking device is in a locking state, the restricting element 920 runs through the hole and is further cooperated with the connecting tube 80. When the unlock button is in an unlocking state, the restricting element 920 is separated from the connecting tube 80, and the sliding rod 92 is slidable with respect to the connecting tube 80. An upper end of the sliding rod 92 extends out of the fixing rod 91, thereby it is convenient for a user to pull the sliding rod 92 upwardly with respect to the connecting tube 80.

The upper end of the sliding rod 92 is rotatably connected to a backrest 11 of the child's tricycle via a connecting element 12, and a lower part of the backrest 11, and a back part of the upper connecting rod assembly 7 and the fixing rod 91 are coaxially and rotatably connected to each other. The connecting element 12, the backrest 11, the fixing rod 91 and the sliding rod 92 together form a crank sliding mechanism.

Figure 5:
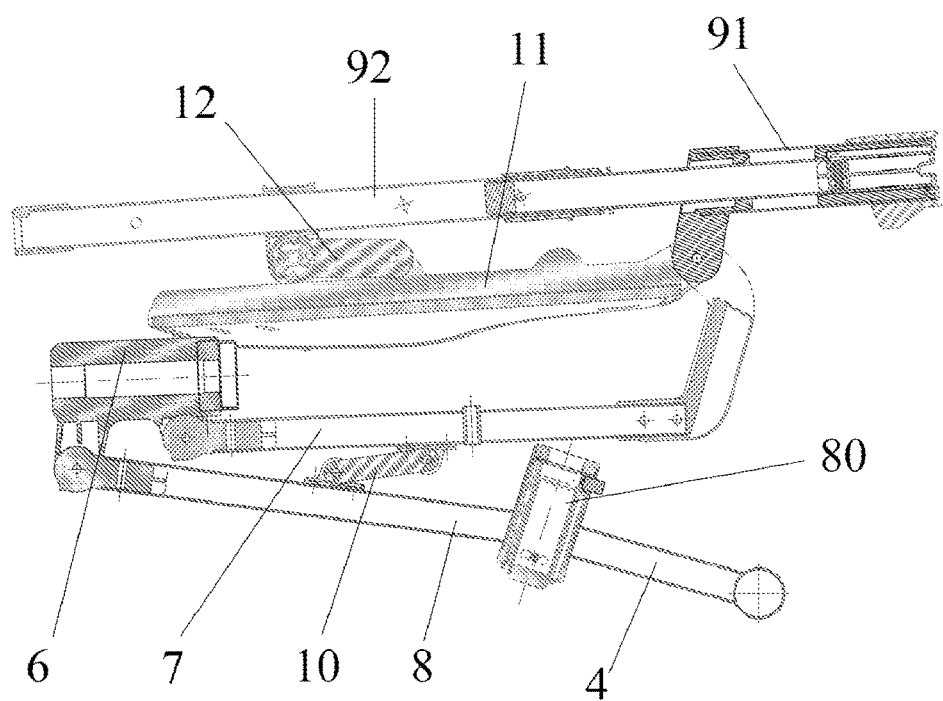
FIG. 5 is a schematic view of the body frame shown in FIG. 2 after the body frame is folded.

When the child's tricycle is unfolded, the locking device is in a locking state, and the child's tricycle can be ridden normally. When the child's tricycle needs to be folded, the folding can be achieved only by three steps: firstly, unlocking the locking device; then pulling the push rod assembly 9 upwardly; and finally turning over the push rod assembly 9 forwardly in such a way that the four-bar linkage is folded in a predetermined direction; in this way, the folding of the child's tricycle can be achieved. In specific, the unlock button 83 is pushed, such that the restricting element 920 is retracted into the sliding rod 92, thereby the connecting tube 80 is unlock and separated from the sliding rod 92. At this time, the sliding rod 92 is pulled upwardly, such that the sliding rod 92 slides upwardly with respect to the fixing rod 91 and the connecting tube 80, and thus the sliding rod 92 is separated from the upper part of the connecting tube 80. And then the upper part of the push rod assembly 9 is turned over forwardly. Due to the restricting structures respectively between the upper connecting rod assembly 7 and the head tube 6, and between the lower connecting rod assembly 8 and the head tube 6, the upper connecting rod assembly 7 can exclusively move backwardly, which makes the upper end of the supporting rod 10 and the upper end of the head tube 6 turn over backwardly with respect to the lower connecting rod assembly 8. Finally, the head tube 6, the upper connecting rod assembly 7 and the supporting rod 10 draw close to the lower connecting rod assembly 8. Since the handlebar is arranged inside the head tube 6, the push rod assembly 9, the handlebar, the upper connecting rod assembly 7 and the lower connecting rod assembly 8 are stacked one to another from up to down after the child's tricycle is folded, and the handlebar is folded backwardly between the push rod assembly 9 and the upper connecting rod assembly 7, and thus the folding of the child's tricycle is achieved, as is shown in FIG. 5.

Those skilled in the art may make many alternatives or modification to the embodiments, according to the disclosure and motivation of the specification. Therefore, the present application is not limited to the specific embodiments disclosed and described herein, and all the alternatives or modification should fall in the protection scope of the claims of the present application. Furthermore, although certain terms are used in the present application, however, these tell is are used for convenience, and the present application is not limited to these.

The invention claimed is:

1. A foldable child's tricycle, having an unfolded state and a folded state, the foldable child's tricycle comprising a body frame, a front fork positioned in the front of the body frame, a front wheel rotatably arranged at a lower part of the front fork, two rear wheel brackets arranged in the back of the body frame, and rear wheels respectively rotatably arranged on the rear wheel brackets; wherein the body frame includes a head tube arranged above the front fork, an upper connecting rod assembly rotatably connected to the head tube, a lower connecting rod assembly rotatably connected to the head tube, a push rod assembly connected in the back of the upper connecting rod assembly and the lower connecting rod assembly, and a supporting rod rotatably connected between the upper connecting rod assembly and the lower connecting rod assembly and further located in front of the push rod assembly; the upper connecting rod assembly, the head tube, the lower connecting rod assembly, and the supporting rod form a four-bar linkage; the push rod assembly is rotatably connected to the upper connecting rod assembly, and is fixed to or separated from the lower connecting rod assembly via a locking device; restricting structures are respectively arranged between the head tube and the upper connecting rod assembly, and between the head tube and the lower connecting rod assembly; after the child's tricycle is folded, the push rod assembly, the upper connecting rod assembly, the head tube, the lower connecting rod assembly and the supporting rod assembly draw close to each other.

2. The foldable child's tricycle according to claim 1, wherein each of the restricting structures includes an upper restricting portion arranged at a lower part in the front of the upper connecting rod assembly, and a lower restricting portion arranged at a lower part in the front of the lower connecting rod assembly; when an upper part of the head tube turns over forwardly, the upper restricting portion and the lower restricting portion are respectively abutted against the head tube, thereby preventing the upper part of the head tube from turning over forwardly.

3. The foldable child's tricycle according to claim 1, wherein the locking device includes a restricting element arranged at a lower part of the push rod assembly, a hole configured for the restricting element to run through and defined on a tube wall of the push rod assembly, and a restricting elastic element arranged between the restricting element and an inner tube wall of the push rod assembly; an unlock button cooperated with the restricting element is arranged on the lower connecting rod assembly; when the locking device is in a locking state, the restricting element runs through the hole, and is cooperated with the lower connecting rod assembly; when the locking device is in an unlocking state via the unlock button, the restricting element is separated from the lower connecting rod assembly, and the push rod assembly is slidable with respect to the lower connecting rod assembly.

4. The foldable child's tricycle according to claim 1, wherein the push rod assembly includes a fixing rod and a sliding rod which is slidable with respect to the fixing rod, and the fixing rod is arranged on the outside of the sliding rod.

5. The foldable child's tricycle according to claim 4, wherein a lower end of the sliding rod extends out of a lower end of the fixing rod, while an upper end of the sliding rod extends out of an upper end of the fixing rod.

6. The foldable child's tricycle according to claim 4, wherein the foldable child's tricycle further includes a backrest configured for a back of a passage to rest against; an upper part of the backrest is rotatably connected to the sliding rod via a connecting element, and a lower part of the backrest is rotatably connected to the fixing rod; the connecting element, the backrest, the fixing rod and the sliding rod together form a crank sliding mechanism.

7. The foldable child's tricycle according to claim 4, wherein the fixing rod is rotatably connected to the back of the upper connecting rod assembly, and the sliding rod is slidably connected to the lower connecting rod assembly.

8. The foldable child's tricycle according to claim 7, wherein the locking device is arranged between the sliding rod and the lower connecting rod assembly.

9. The foldable child's tricycle according to claim 8, wherein a connecting tube having a same extension direction with the push rod assembly is arranged in the back of the lower connecting rod assembly; the locking device includes a restricting element arranged at a lower part of the push rod assembly, a hole configured for the restricting element to run through and defined on a tube wall of the push rod assembly, and a restricting elastic element arranged between the restricting element and an inner tube wall of the push rod assembly; an unlock button cooperated with the restricting element is arranged on the connecting element; when the locking device is in a locking state, the restricting element runs through the hole, and is cooperated with the connecting tube; when the locking device is in an unlocking state via the unlock button, the restricting element is separated from the connecting tube, and the push rod assembly is slidable with respect to the connecting tube.

10. The foldable child's tricycle according to claim 9, wherein the rear wheel brackets are fixedly connected to the connecting tube, thereby foil ling a "T"-shaped structure.

11. The foldable child's tricycle according to claim 1, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

12. The foldable child's tricycle according to claim 2, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

13. The foldable child's tricycle according to claim 3, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

14. The foldable child's tricycle according to claim 4, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

15. The foldable child's tricycle according to claim 5, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

16. The foldable child's tricycle according to claim 6, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

17. The foldable child's tricycle according to claim 7, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

18. The foldable child's tricycle according to claim 8, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

19. The foldable child's tricycle according to claim 9, wherein the foldable child's tricycle further includes a handlebar which is arranged in the head tube and is rotatable with respect to the head tube; when the foldable child's tricycle is in a folded state, the push rod assembly, the head tube, the upper connecting rod assembly and the lower connecting rod assembly are stacked one to another from up to down.

20. A folding method for a child's tricycle according to claim 1, wherein the method comprises the following steps: when folding, firstly unlocking the locking device; then pulling the push rod assembly upwardly such that the push rod assembly is separated from the lower connecting rod assembly; and finally turning over the push rod assembly forwardly in such a way that the push rod assembly, the head tube, the upper connecting rod assembly and the lower connecting rod assembly are stacked one to another from up to down.

* * * * *